United States Patent
Wildey et al.

(10) Patent No.: US 9,975,375 B2
(45) Date of Patent: May 22, 2018

(54) WHEEL COVER

(71) Applicant: Consolidated Metco, Inc., Vancouver, WA (US)

(72) Inventors: Graham Wildey, Vancouver, WA (US); Mike Miga, Vancouver, WA (US)

(73) Assignee: Consolidated Metco, Inc., Vancouver, WA (US)

( * ) Notice: Subject to any disclaimer, the term of this patent is extended or adjusted under 35 U.S.C. 154(b) by 100 days.

(21) Appl. No.: 15/071,938

(22) Filed: Mar. 16, 2016

(65) Prior Publication Data
US 2017/0267023 A1 Sep. 21, 2017

(51) Int. Cl.
*B60B 7/16* (2006.01)
*B60B 7/06* (2006.01)
*B60B 7/04* (2006.01)

(52) U.S. Cl.
CPC ............... *B60B 7/16* (2013.01); *B60B 7/04* (2013.01); *B60B 7/06* (2013.01); *B60B 2900/115* (2013.01)

(58) Field of Classification Search
CPC .. B60B 7/00; B60B 7/06; B60B 7/066; B60B 7/16
See application file for complete search history.

(56) References Cited

U.S. PATENT DOCUMENTS

| | | | | |
|---|---|---|---|---|
| 3,352,133 A | * | 11/1967 | Selleck | B60B 7/16 301/37.21 |
| 6,419,326 B1 | * | 7/2002 | Rains | B60B 7/16 301/37.21 |
| 7,530,643 B1 | * | 5/2009 | Walker | B60B 7/16 301/37.21 |

\* cited by examiner

*Primary Examiner* — Jason R Bellinger
(74) *Attorney, Agent, or Firm* — Amsted Industries Incorporated

(57) ABSTRACT

A commercial vehicle wheel cover is provided. The assembly includes two handles and two interlocking cam latch mechanisms. The wheel cover assembly is attached to the wheel hub via two cam latch mechanisms which lock into a collar assembly. The collar assembly includes of two collar halves and a latch that, when installed, applies a compressive force on the axle hub flange holding the assembly to the hub.

8 Claims, 7 Drawing Sheets

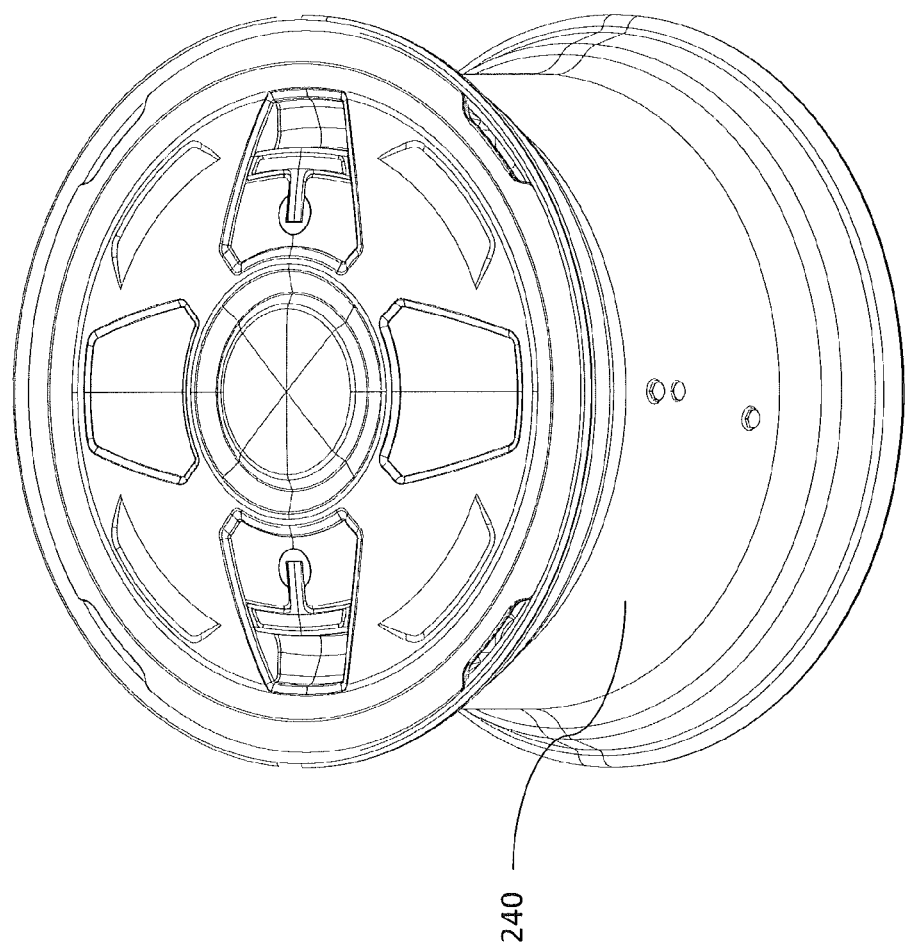

WHEEL COVER

BACKGROUND OF THE INVENTION

The invention relates generally to a commercial vehicle wheel cover, and more particularly to a wheel cover with a collar attachment system utilizing quarter turn handles.

This invention is applicable to commercial vehicles, namely trucks, trailers, and buses. A wheel cover is used create a more aerodynamic shape on commercial vehicles, by filling the void or indentation created by the rims of the wheels. The wheel covers are installed manually by a mechanic, a truck driver, or another person, and generally take a significant amount of time to complete installation on all the wheels.

The current wheel covers used in the commercial vehicle industry are difficult and time consuming to install, and do not provide an easy method for pre-trip inspection. After the wheel covers are installed, an operator will likely have to completely uninstall the wheel covers to comply with the pre-trip inspection laws requiring the operator to inspect the hubs and wheels prior to every trip.

The present invention provides a wheel cover that allows for the simplification of the installation process and can be easily detached for inspection purposes.

SUMMARY OF THE INVENTION

In accordance with the present invention, a commercial vehicle wheel cover is provided for use.

One embodiment of the present commercial vehicle wheel cover includes a wheel cover assembly having at least two handles, and at least two cam latch mechanisms. The wheel cover assembly has a front side and a back side, with at least two handles attached to at least two interlocking cam latch mechanisms arranged integrally on the wheel cover. The wheel cover assembly is attached to the hub via at least two cam latch mechanisms which lock into a collar assembly. The collar assembly consists of at least two collar halves and a latch that, when installed, applies a compressive force on the axle hub flange holding the assembly to the axle hub. Each of the at least two collars contain retention features that receive the interlocking features of the cam latch mechanism of the wheel cover assembly.

Another embodiment of the present commercial vehicle wheel cover includes a wheel cover assembly having a plurality of handles, and a plurality of cam latch mechanisms. The wheel cover assembly has a front side and a back side, with a plurality of handles attached to a plurality of interlocking cam latch mechanisms arranged integrally on the wheel cover. The wheel cover assembly is attached to the hub via a plurality of cam latch mechanisms which lock into a collar assembly. The collar assembly consists of a plurality of collar halves and a latch that, when installed, applies a compressive force on the axle hub flange holding the assembly to the axle hub. Each of the plurality of collars contain retention features that receive the interlocking features of the cam latch mechanism of the wheel cover assembly.

It is an object of the present invention to provide a commercial vehicle wheel cover that improves the overall aerodynamic shape of a vehicle.

It is another object of the present invention to provide a commercial vehicle wheel cover that is simple to install and can be installed and removed by a user in minimal time.

It is another object of the present invention to provide a commercial vehicle wheel cover that can be easily removed to allow a user access to the hub and tire to complete pre-trip inspection as required by law.

It is another object of the present invention to provide a commercial vehicle wheel cover that includes an attachment assembly featuring two or more collar pieces fastened together and to the hub axle flange via one or more latch assemblies consisting of multitude of materials.

DESCRIPTION OF THE DRAWINGS

In the drawings,

FIG. 7 is an isometric view of the wheel cover assembly in the installed position on a wheel.

DETAILED DESCRIPTION

Figure 1:
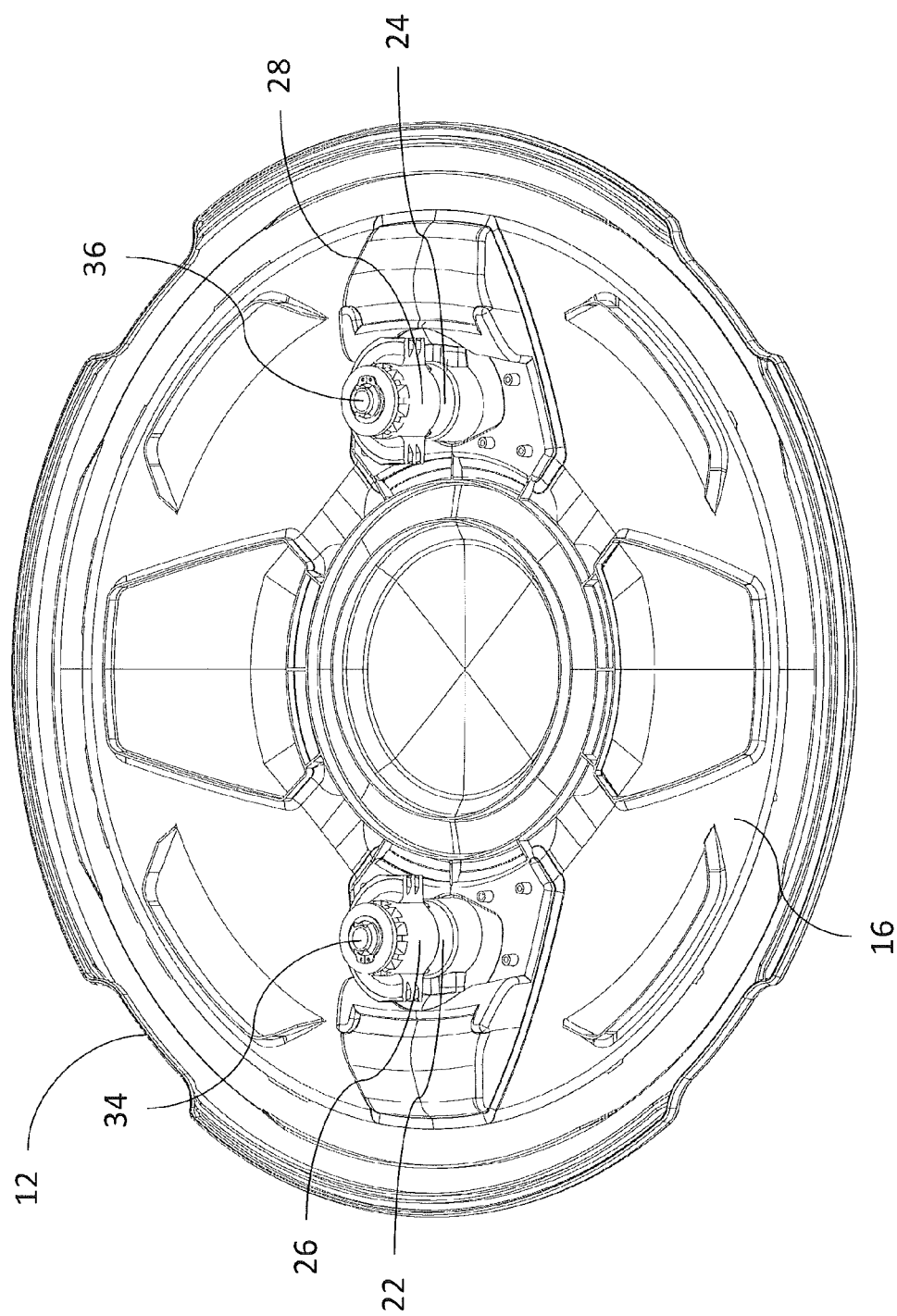
FIG. 1 is a back side isometric view of the commercial vehicle wheel cover assembly.
Figure 2:
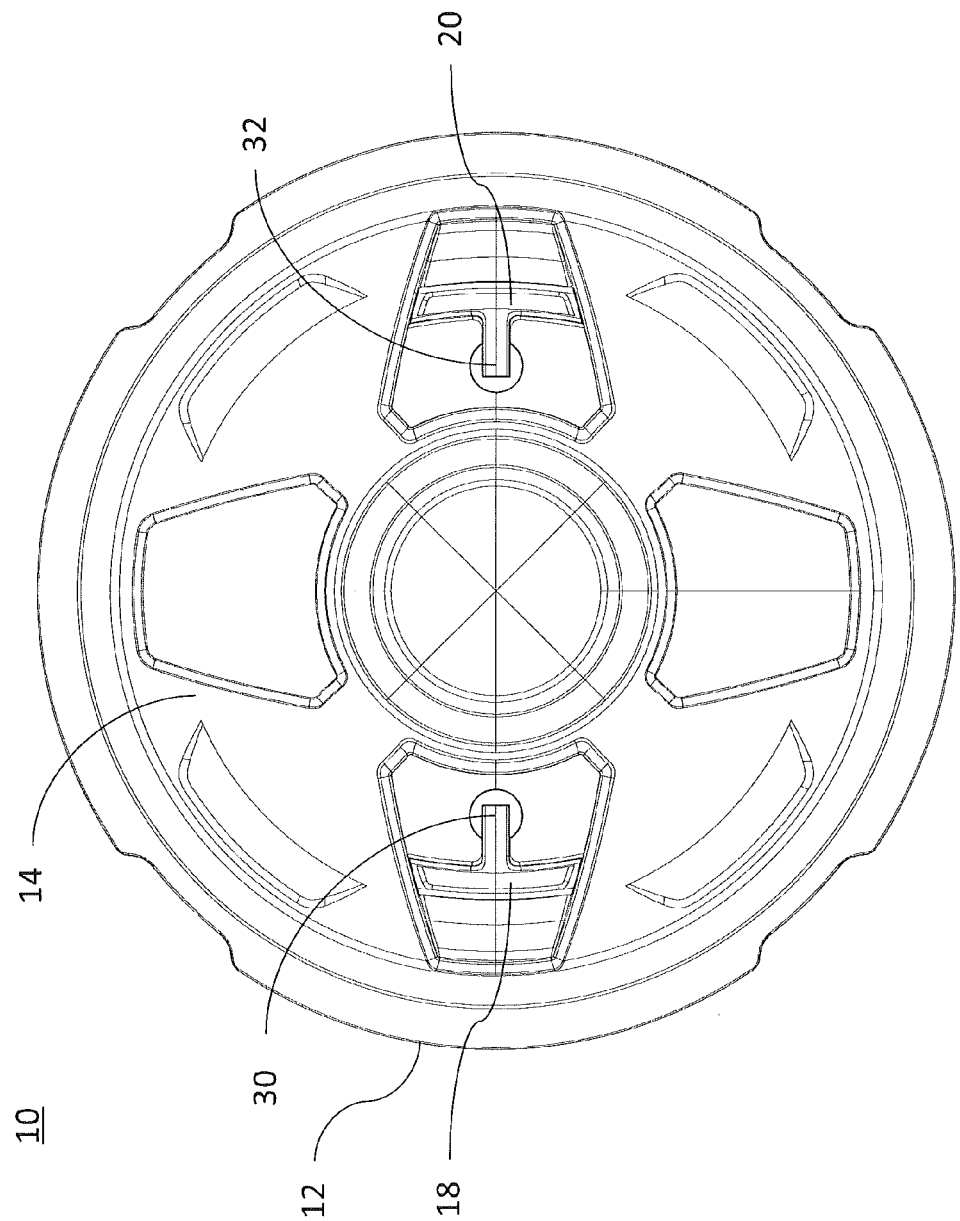
FIG. 2 is a top plan view of the commercial vehicle wheel cover.

Referring now to FIGS. 1-2, a commercial vehicle wheel cover is generally designated 10, and comprises a wheel cover 12, a front side 14, a back side 16, handles 18 and 20, and cam latch assemblies 22 and 24. The wheel cover 12, is generally round and dome-shaped. The front side 14, consists of handles 18 and 20, and hinge points 30 and 32, for lifting the handles to the open position and lowering to the closed position. The cam latch assemblies are fixed in the installation position with the handles 18 and 20, in the closed position as shown in FIG. 2. When the handles 18 and 20, are in the lifted or open position the cam latch assemblies are free to rotate about the cam latch axes 34 and 36, for installation and removal purposes.

The wheel cover 12 can be made from a polymeric material by a molding process, or it can be made from a metallic material by a stamping process. The cam latch assemblies 22 and 24 can be made from polymeric materials by a molding process with the exception of the spring, roll pin, and E-clip which are generally made from metallic materials, preferably stainless steel.

Figure 3:
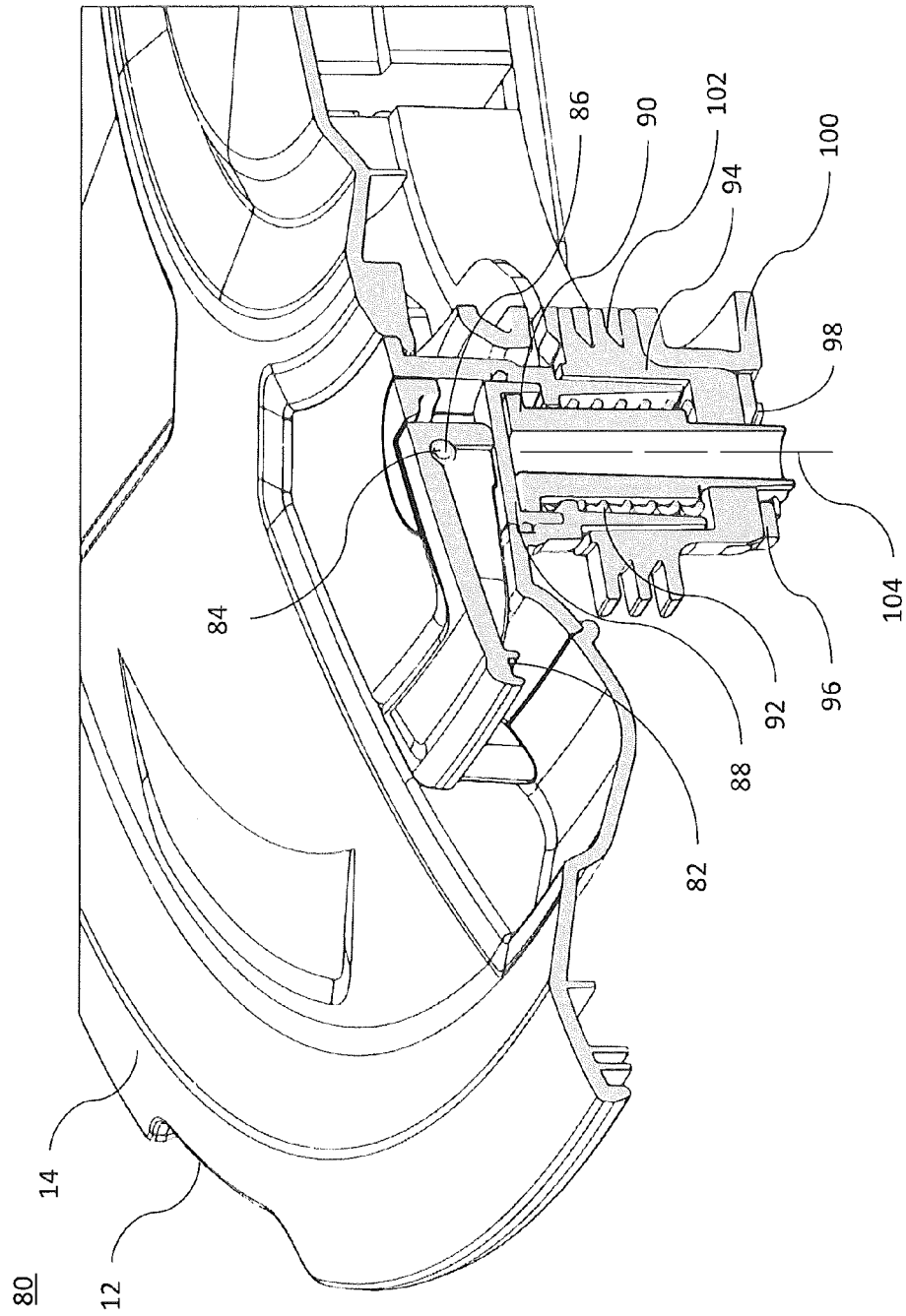
FIG. 3 is a cross section view of the cam latch assembly.
Figure 4:
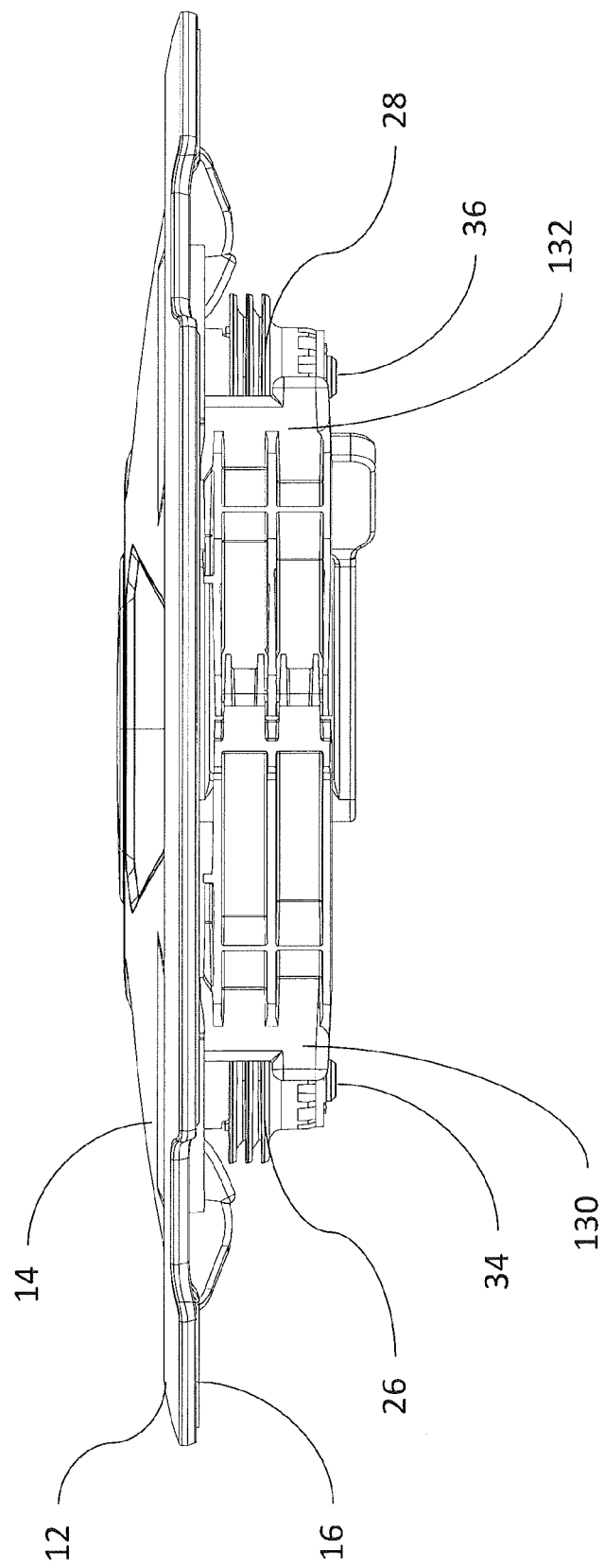
FIG. 4 is a side elevational view of the commercial vehicle wheel cover.
Figure 5:
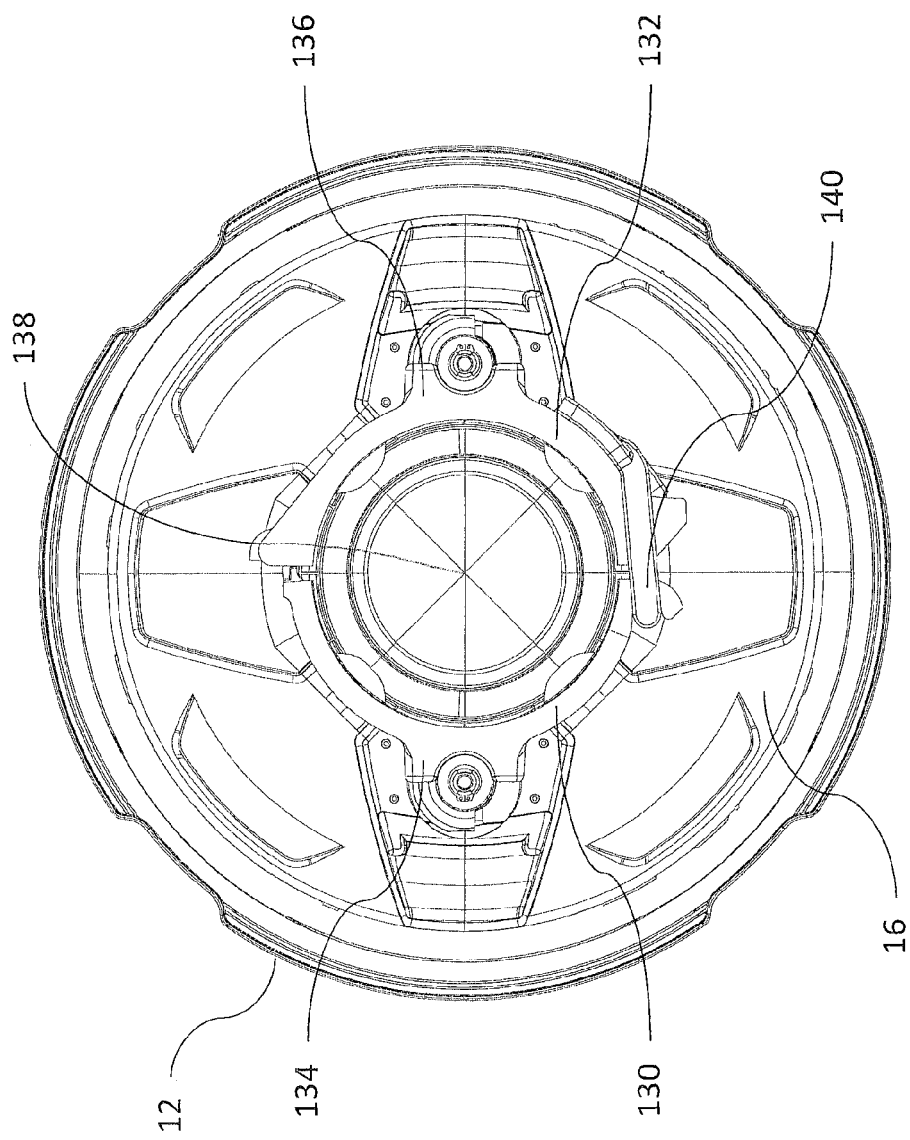
FIG. 5 is a bottom plan view of the commercial vehicle wheel cover assembly installed on the collar assembly.
Figure 6:
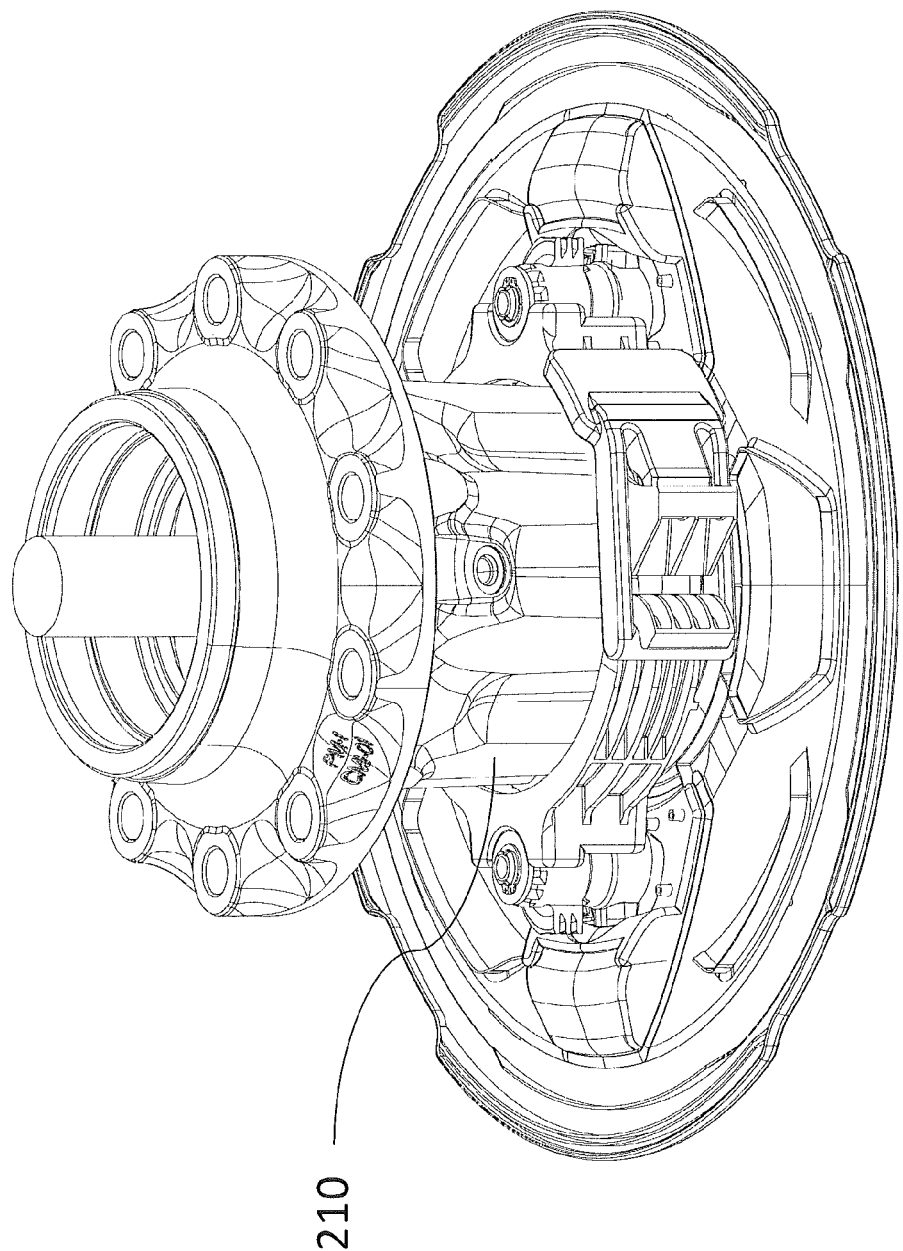
FIG. 6 is an isometric view of the wheel cover assembly and collar assembly in the installed position on an axle hub.

Referring to FIG. 3, one of the two cam latch assemblies is generally designated 80, and consists of a number of components including a handle 82, a roll pin 84, a hinge point 86, a spacer 88, a shaft 90, a spring 92, a cam 94, a washer 96, and a E-clip 98. When the handle is in the closed position as shown in FIG. 3, the spring is compressed and the assembly is restricted from rotation and lateral movement.

The cam 94, is locked into the collar 100, via a set of radial blades 26, 28 which are received by the collar in the interlock location 102, which fixes the cam assembly and, thus, the wheel cover 12, to the collar assembly. When the handle 82, is lifted the wheel cover 12, shifts upward away from the collar and the cam assembly is free to rotate about the cam latch axis 104 for installation and removal purposes.

Referring to FIGS. 4-7, the commercial wheel cover 12, interlocks with a collar assembly for retention on the axle hub. The collar assembly consists of two collars, 130 and 132, and is designed to fit over and cradle the axle hub flange.

The collar assembly is installed on the axle hub flange by rotating the assembly open via the collar rotation axis 138, and then closing the collars around the axle hub flange 210 as shown in FIG. 7. The assembly is then secured to the axle hub flange by installing a latch 140, onto the first collar 130, and then over-center latching onto the second collar 132.

When installed the latch holds a compressive force on the axle hub flange securing the collar assembly to the wheel 240.

The user installs the wheel cover assembly to the collar assembly by lifting the handles 18 and 20, about the hinge point 86 and rotating 90 degrees about the axes 34 and 36. The user then lifts the wheel cover into position and rotates the handles back 90 degrees. Once engaged with the collar assembly via the interlock locations 134 and 136, the handles are lowered about hinge point 86 completely into the wheel cover.

The assembly is attached improving the overall aerodynamic shape of the wheel as shown in FIG. 7.

While particular embodiments of the present invention have been illustrated and described herein, it will be appreciated by those skilled in the art that changes and modifications may be made thereto without departing from the invention in its broader aspects.

What is claimed is:

1. A vehicle wheel cover assembly comprising:
   a wheel cover;
   at least two handles;
   at least two cam latching mechanisms;
   a collar assembly;
   a latch, and an axle hub flange,
   wherein the wheel cover has a front side and a back side,
   each handle is attached to the interlocking cam latching mechanism on the front side of the wheel cover;
   wherein the cam latching mechanisms lock into the collar assembly;
   wherein the collar assembly comprises at least two collar halves,
   and wherein the latch applies a compressive force on the axle hub flange holding the collar assembly to the wheel cover, and
   wherein the collar assembly includes retention features that receive the cam latch mechanism of the wheel cover assembly.

2. The vehicle wheel cover of claim 1, wherein each handle is assembled by inserting a spacer component into a latch shaft component followed by inserting a roll pin through a first wall of the latch shaft, through the handle, and into a second wall of the latch shaft.

3. The vehicle wheel cover of claim 2 wherein the handle is then inserted into the wheel cover and installed by placing a spring, cam latch, washer, and E-clip from the back side of the wheel cover.

4. The vehicle wheel cover of claim 1, wherein each cam latch mechanism interlocks with the collar assembly fixing the wheel cover assembly to the axle hub flange.

5. A vehicle wheel cover comprising:
   a wheel cover assembly;
   a plurality of handles;
   a plurality of cam latching mechanisms;
   a collar assembly;
   a latch, and an axle hub flange;
   wherein the wheel cover has a front side and a back side,
   each handle is attached to an interlocking cam latch mechanism on the front side of the wheel cover;
   wherein the cam latching mechanisms lock into the collar assembly;
   wherein the collar assembly comprises a plurality of collar components,
   and wherein the latch applies a compressive force on the axle hub flange holding the collar assembly to the wheel cover, and
   wherein the collar assembly includes retention features that receive the cam latch mechanism of the wheel cover assembly.

6. The vehicle wheel cover of claim 5, wherein each handles is assembled by inserting a spacer component into a latch shaft component followed by inserting a roll pin through a first wall of the latch shaft, through the handle, and into a second wall of the latch shaft.

7. The vehicle wheel cover of claim 5, wherein the handle is then inserted into the wheel cover and installed by placing a spring, cam latch, washer, and E-clip from the back side of the wheel cover.

8. The vehicle wheel cover of claim 5, wherein each cam latch mechanism interlocks with the collar assembly fixing the wheel cover assembly to the axle hub flange.

* * * * *